(12) United States Patent
Stock et al.

(10) Patent No.: US 11,045,765 B2
(45) Date of Patent: Jun. 29, 2021

(54) METALLIC HONEYCOMB BODY WITH ADHESION IMPROVING MICROSTRUCTURES

(71) Applicant: Vitesco Technologies Group GMBH, Hannover (DE)

(72) Inventors: Holger Stock, Siegburg (DE); Peter Hirth, Rösrath (DE); Ferdi Kurth, Mechernich (DE); Olaf Helmer, Siegburg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/663,663

(22) Filed: Oct. 25, 2019

(65) Prior Publication Data

US 2020/0054995 A1 Feb. 20, 2020

Related U.S. Application Data

(63) Continuation of application No. PCT/EP2018/060357, filed on Apr. 23, 2018.

(30) Foreign Application Priority Data

Apr. 27, 2017 (DE) .................. 10 2017 207 151

(51) Int. Cl.
*B01J 35/04* (2006.01)
*B21D 13/04* (2006.01)
*B01D 53/94* (2006.01)

(52) U.S. Cl.
CPC .......... *B01D 53/9431* (2013.01); *B01J 35/04* (2013.01); *B21D 13/04* (2013.01)

(58) Field of Classification Search
CPC .................. B01J 35/04; B21D 13/04
See application file for complete search history.

(56) References Cited

U.S. PATENT DOCUMENTS 4,098,722 A 7/1978 Cairns et al.
5,045,403 A * 9/1991 Maus ................ B01J 35/04
428/593

(Continued)

FOREIGN PATENT DOCUMENTS

CN 101128655 A 2/2008
DE 2636671 A1 3/1977
(Continued)

OTHER PUBLICATIONS

International Search Report and Written Opinion dated Jun. 7, 2018 from corresponding International Patent Application No. PCT/EP2018/060357.

(Continued)

*Primary Examiner* — Cam N. Nguyen

(57) ABSTRACT

A metallic honeycomb body with channels through which a gas may flow, made up of layers of at least partially structured sheet metal, the layers of sheet metal having at least in subregions at least two different structures, of which the first structure, with a greater structure height (H), determines the size of the channels and the second structure has a much smaller structure height (h) between troughs and peaks and the form and/or the structure height (H) of the second structure being chosen such that a ceramic coating applied later may fill the troughs of the second structure on average to at least 10%, in particular at least 50%, of their structure height (h). With the honeycomb body according to the invention, more coating material per unit of volume is durably attached in a metallic honeycomb body without excessively increasing the pressure loss. This is of advantage particularly for applications for reducing nitrogen oxides (NOx) in diesel exhaust gases.

14 Claims, 3 Drawing Sheets

(56) References Cited

U.S. PATENT DOCUMENTS

| | | | | |
|---|---|---|---|---|
| 5,130,208 | A * | 7/1992 | Maus | B01J 35/04 428/593 |
| 5,322,672 | A * | 6/1994 | Breuer | F01N 3/2026 422/180 |
| 5,370,943 | A * | 12/1994 | Bruck | B01J 35/04 428/593 |
| 5,431,886 | A * | 7/1995 | Rolf | F01N 3/281 422/174 |
| 5,480,621 | A * | 1/1996 | Breuer | F01N 3/2026 422/174 |
| 5,632,961 | A * | 5/1997 | Sheller | B01J 35/04 422/177 |
| 5,651,906 | A * | 7/1997 | Whittenberger | B01J 35/0033 219/552 |
| 5,846,495 | A * | 12/1998 | Whittenberger | B01J 35/04 422/180 |
| 6,365,283 | B1 * | 4/2002 | Bruck | B01D 53/9454 428/593 |
| 6,368,726 | B1 * | 4/2002 | Holpp | F01N 3/2875 428/593 |
| 6,689,327 | B1 * | 2/2004 | Reck | F01N 3/2013 422/180 |
| 6,721,864 | B2 * | 4/2004 | Keskar | G06F 13/1694 365/230.03 |
| 7,090,892 | B2 * | 8/2006 | Becker | C23C 4/18 118/52 |
| 7,111,393 | B2 | 9/2006 | Bruck | |
| 7,261,865 | B2 * | 8/2007 | Bruck | B01D 53/885 422/180 |
| 7,682,705 | B2 * | 3/2010 | Hodgson | B21D 35/00 428/593 |
| 7,943,096 | B2 * | 5/2011 | Kurth | F01N 3/281 422/180 |
| 7,968,208 | B2 * | 6/2011 | Hodgson | F01N 3/2814 428/593 |
| 8,173,268 | B2 * | 5/2012 | Maus | B23K 1/0014 428/593 |
| 8,389,438 | B2 * | 3/2013 | Wieres | B01J 35/04 502/439 |
| 9,091,196 | B2 * | 7/2015 | Maus | F01N 3/281 |
| 9,393,521 | B2 * | 7/2016 | Brueck | F01N 3/2026 |
| 9,623,373 | B2 * | 4/2017 | Brueck | F01N 3/2026 |
| 9,784,160 | B2 * | 10/2017 | Bruck | F01N 3/281 |
| 10,054,024 | B2 * | 8/2018 | Maus | F01N 3/281 |
| 2003/0203816 | A1 * | 10/2003 | Sangiovanni | B01J 37/036 502/439 |
| 2005/0054526 | A1 * | 3/2005 | Steinke | C23C 2/26 502/439 |
| 2005/0095180 | A1 * | 5/2005 | Wieres | F01N 3/281 422/180 |
| 2005/0096218 | A1 * | 5/2005 | Kurth | F01N 3/2875 502/439 |
| 2006/0107656 | A1 * | 5/2006 | Bruck | F01N 3/2892 60/288 |
| 2015/0030509 | A1 * | 1/2015 | Brueck | B01D 53/8678 422/174 |

FOREIGN PATENT DOCUMENTS

| | | |
|---|---|---|
| DE | 2636672 A1 | 3/1977 |
| DE | 3534904 A1 | 4/1987 |
| EP | 0201614 A1 | 11/1986 |
| FR | 2321347 A1 | 3/1977 |

OTHER PUBLICATIONS

German Office Action dated Dec. 7, 2017 for corresponding German Patent Application No. 10 2017 207 151.6.

Chinese Office Action dated Nov. 27, 2020 for corresponding Chinese Patent Application No. 201880021065.0.

* cited by examiner

METALLIC HONEYCOMB BODY WITH ADHESION IMPROVING MICROSTRUCTURES

CROSS-REFERENCE TO RELATED APPLICATIONS

This application claims the benefit of PCT Application PCT/EP2018/060357, filed Apr. 23, 2018, which claims priority to German Patent Application 10 2017 207 151.6, filed Apr. 27, 2017. The disclosures of the above applications are incorporated herein by reference.

FIELD OF THE INVENTION

The present invention relates to a metallic honeycomb body with channels through which a gas can flow, made up of layers of at least partially structured sheet metal. Such honeycomb bodies are known in many different configurations and serve generally as a support for catalytically active coatings for the elimination of harmful or undesired constituents from a gas stream, in particular an exhaust gas stream of an internal combustion engine. The present case is particularly concerned with honeycomb bodies for cleaning diesel exhaust gases, in particular for eliminating nitrogen oxides (NOx) from the exhaust gas of a diesel engine. Various forms, sizes and alignments have already been proposed in the past for the structuring of layers of sheet metal in metallic honeycomb bodies, with the aim of either increasing the durability or increasing turbulences in the honeycomb body, performing a flow directing function or increasing the surface area that comes into contact with a gas stream.

BACKGROUND OF THE INVENTION

DE 26 36 672 C2 describes for example a honeycomb body of which the layers of sheet metal have a microstructure, some of the layers of sheet metal also having a macrostructure, which substantially determines the size of channels through which a gas can flow. This type of structuring was aimed at increasing the effective surface area in the honeycomb body, which means that a coating applied later had to be relatively thin in order that it could substantially follow the microstructures. It was in this case ensured that the microstructures were designed such that they were not filled during the later coating, since this was regarded as a loss of effective surface area and undesired. For technical production-related reasons, and because uniform coating of such structures proved to be very difficult, this concept was not pursued.

However, the elimination of for example nitrogen oxides from a gas stream presents an entirely different situation. What matters in this case is not only the size of the surface area of a coating that comes into contact with the gas stream to be cleaned, but also the overall oxygen storage capacity of a coating, that is to say also the total amount of coating material, that is to say also the thickness of the coating. On conventional honeycomb bodies, a coating that is typically used for such purposes adheres best in the interstices that form in the vicinity of points of contact of smooth and corrugated metal sheets, while only small amounts of coating adhere on the smooth side walls of a channel. Although the amount of coating adhering can be improved by increasing the number of channels per unit area, the hydraulic cross sections of the channels thereby become ever smaller and the pressure loss in such a honeycomb body becomes ever greater.

SUMMARY OF THE INVENTION

The object of the present invention is to fix a greater amount of ceramic coating material durably in a metallic honeycomb body by suitable structuring of the layers of sheet metal without excessively increasing the pressure loss. A metallic honeycomb body with the features described serves for achieving this object. Advantageous developments are specified in the dependent claims, it being possible for these to be used individually or when combined with one another in a technically meaningful way.

The present invention makes use of the property of a ceramic coating previously regarded as a disadvantage, of adhering particularly well in acute angles between sheet metal walls by surface forces and forces of adhesion. A metallic honeycomb body according to the invention with channels through which a gas may flow, made up of layers of at least partially structured sheet metal, is distinguished by the fact that the layers of sheet metal have at least in subregions at least two different structures, of which the first structure, with a greater structure height, determines the size of the channels and the second structure has a much smaller structure height between troughs and peaks and the form and/or the structure height of the second structure is chosen such that a ceramic coating applied later may fill the troughs of the second structure on average to at least 10% of their structure height. It should be assumed in this case that not all of the troughs are filled exactly to the same height, since production tolerances and customary coating steps do not allow this. On average, however, the coating will partially fill the troughs, whereby considerably more coating material adheres on the metal sheets than would be the case without the second structure or with a thin coating following the second structure.

In the case of a preferred embodiment of the invention, the second structure is a zigzag corrugation with troughs which, considered on average, form an acute angle between flanks delimiting the troughs, preferably an angle of less than 75°, in particular less than 50°. Although it will not be possible for technical production-related reasons really to fold metal sheets, since a certain minimum radius of curvature is always necessary for this, this is immaterial for the way in which the invention acts, as long as the flanks of the troughs (which do not necessarily have to run in a straight line) form an acute angle with one another only in their lower end region before a possible curvature in a minimum radius of curvature. Such an angle has a similar effect on the adherence of a coating as an interstice at points of contact of smooth and corrugated metal sheets.

Preferably, the angles of the flanks and the structure height of the second structure are chosen in dependence on the planned coating such that the coating may fill at least 20% of the structure height, preferably at least 30%, in particular even at least 50%. According to the invention, such a honeycomb body after its completion bears a coating for the removal of nitrogen oxides (NOx) and/or hydrocarbons (CHx) from a gas stream, the coating that additionally adheres in the troughs increasing the storage capability of the honeycomb body for one or more of the reaction components, in particular oxygen, nitrogen oxides, ammonia and/or hydrocarbons.

In order on the other hand also to achieve an additional effect with respect to the size of the surface area that comes into contact with the gas stream, in the case of a preferred embodiment of the invention the second structure height is made of such a size that it cannot be completely leveled by a coating, in particular at least 10%, preferably at least 30%, of the structure height remains. In this way, a coating that still easily follows the second structure is produced, whereby on the one hand the surface area delimiting a channel is increased and on the other hand the amount of coating adhering is increased.

In a further preferred embodiment, the honeycomb body is wound from layers of sheet metal and/or laminated in a way known per se, the metal sheets preferably being soldered to one another at a multiplicity of points of contact and at least one of the layers of sheet metal not having a second structure in the region of the points of contact. In particular, it is possible to wind up a layer of sheet metal without a first structure and without a second structure together with an adjacent layer of sheet metal that has both structures. This is of advantage for technical production-related reasons and leads to defined points of contact. It is possible however to provide a layer of sheet metal that is provided with the first structure with the second structure only in the regions of the flanks of the first structure. This also leads to an easier sliding of adjacent layers of sheet metal on one another during winding and allows defined points of contact for soldering.

According to the invention, a height of 1 to 4 mm is provided as a suitable size for the first structure height, while the smaller second structure height should be 0.1 to 0.8 mm. The ratio of the first to the second structure height is greater than 1.3, preferably greater than 1.5.

The periodicity (also known as the "pitch") of the first structure lies in the range that is usual for honeycomb bodies, that of the second, smaller structure lies between 0.05 and 0.2 mm, with the intention that it should be chosen to be so small that there form sufficiently narrow troughs with a suitable angle of their flanks in relation to one another.

In this way it is possible according to the invention to produce a metallic honeycomb body which bears a (ceramic) coating for the conversion of undesired components of a gas stream, in particular NOx, of at least 200 g/l (grams per liter of volume of the honeycomb body) with a cell density of for example at least 50 cpsi (cells per square inch). Preferably, 250 g/l or even 300 g/l are applied, it being possible for cell densities of up to 600 cpsi to be used.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Exemplary embodiments of the invention, to which the invention is however not restricted, are explained in more detail below on the basis of the drawing, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
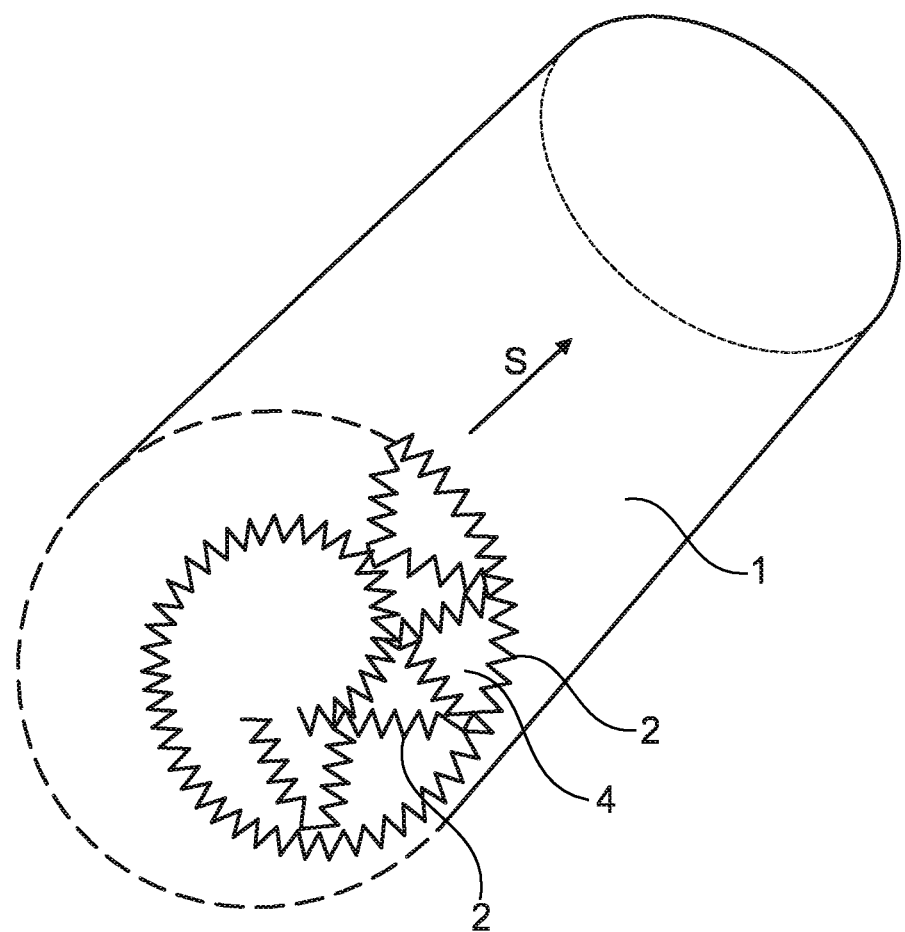
FIG. 1 schematically shows in an end-on view part of a honeycomb body according to the invention with a microstructure on all of the layers of sheet metal.

FIG. 1 schematically shows a honeycomb body 1 wound from layers of sheet metal 2 or laminated in a way known per se, it being immaterial for the invention which form of construction is used. What is important, however, is that the layers of sheet metal have at least in subregions a first structure 3 with a greater structure height H, which substantially determines the size of channels 4 in the honeycomb body 1. These channels 4 are flowed through by a gas in a direction of flow S and the first structure 3 is typically a corrugation running transversely in relation to the direction of flow. Furthermore, the layers of sheet metal 3 have at least in subregions a second structure 5 with a smaller structure height h, which serves the purpose of durably fixing more coating material in the honeycomb body. The second structure forms troughs 6 and peaks 7, which typically run in the direction of flow. The second structure 5 is therefore usually also a corrugation running transversely in relation to the direction of flow S. It is important for the adherence of coating material that the second structure 5 in the lower region of the troughs 6 is designed such that an acute angle, preferably even an angle below 75°, in particular even below 50°, forms. Then, the structure there resembles an interstice between corrugated and smooth layers of sheet metal, in which typically a particularly great amount of coating material is deposited.

Figure 2:
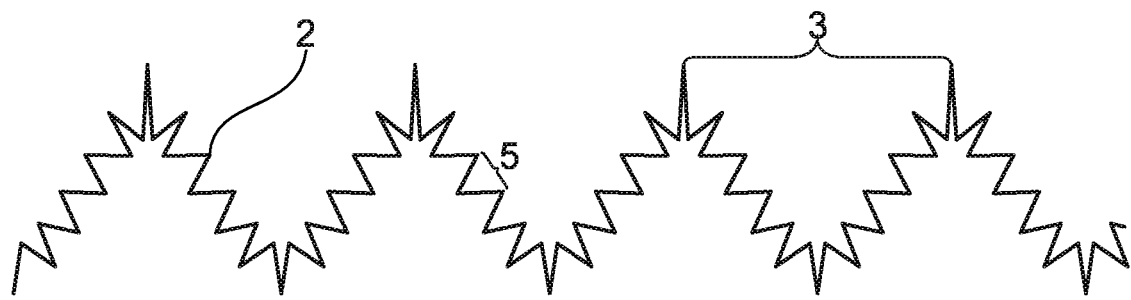
FIG. 2 shows a layer of sheet metal with a microstructure according to the invention.

FIG. 2 schematically shows a portion of a layer of sheet metal 2 with a first structure 3 and a second structure 5, in the present case a zigzag corrugation. A honeycomb body 1 according to the invention may be designed completely in this way, but it is also possible to alternately use smooth layers of sheet metal and those described here.

Figure 3:
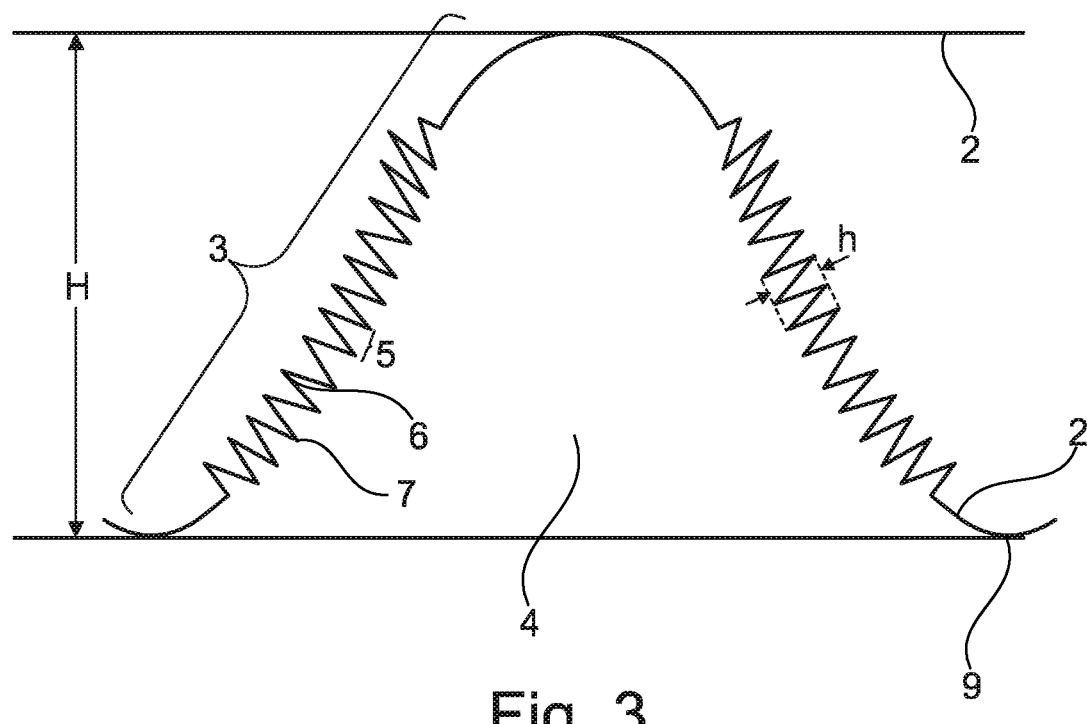
FIG. 3 shows a schematic cross section of a cell of a honeycomb body according to the invention with second structures only at subregions of the channel walls.

FIG. 3 schematically shows as an exemplary embodiment of the invention the cross section of a channel 4 of a honeycomb body 1 according to the invention in which second structures 5 are only present in subregions of the channel walls. The greater structure height H of a layer of sheet metal 2 corrugated with a first structure 3, which is arranged between two layers of smooth sheet metal 2, determines the size of the channel 4. The layers of sheet metal 2 touch at points of contact 9, where they may, if appropriate, also be soldered to one another. A second structure 5 with a smaller structure height h is present in subregions of the channel walls, and here forms troughs 6 and peaks 7. It should be noted here that a trough 6 in one channel 4 forms a peak 7 in a respectively adjacent channel, and vice versa.

Figure 4:
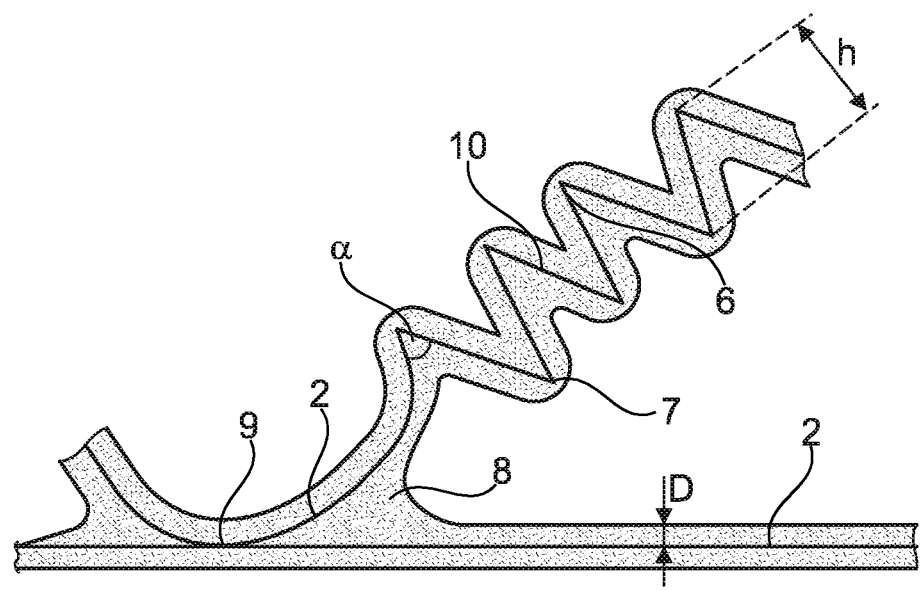
FIG. 4 shows a detail from FIG. 3 with an applied coating.

FIG. 4 shows an enlarged detail from FIG. 3 after the application of a coating 8. This coating has a thickness D, which however is not the same everywhere. The coating is thicker in the interstices in the vicinity of the point of contact 9 and in the troughs 6 of the second structure 5 than in other regions. The coating partly fills the troughs 6, as a result of which considerably more coating material is durably attached in the honeycomb body 1 than without the second structure 5. It is important for the at least partial filling of the troughs 6 with coating 8 that in a lower end region the flanks 10 of the troughs form in relation to one another an acute angle α (alpha), which is preferably less than 75°, in particular less than 50°.

Figure 5:
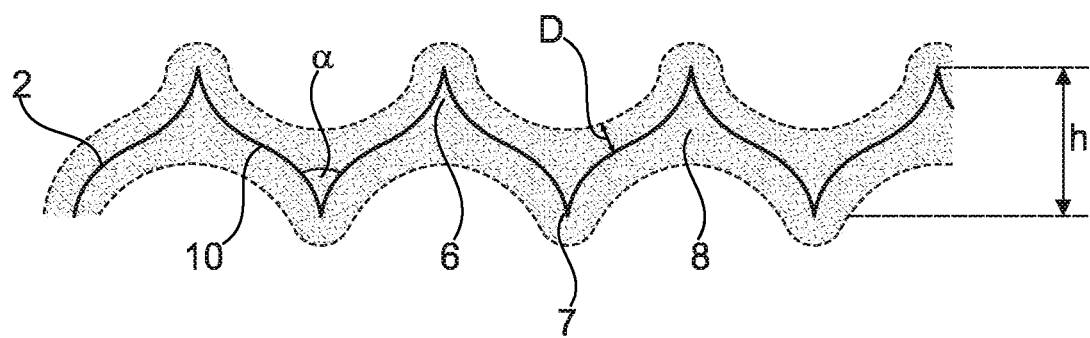
FIG. 5 shows a portion of a layer of sheet metal with a microcorrugation, in which acute angles form even in the case of wide corrugation troughs.

FIG. 5 illustrates that it is not absolutely necessary for the invention that the troughs 6 of the second structure 5 are delimited by straight flanks 10. It is sufficient if conditions such as occur in an interstice at points of contact of smooth and corrugated metal sheets are established in a lower end region of the flanks. Then good retention is obtained even for a greater thickness D of a coating 8.

The present invention is suitable in particular for the durable fixing of coatings in a honeycomb body for the elimination of nitrogen oxides (NOx) from a gas stream, in particular in the exhaust gas cleaning of diesel engines, where not only the contact surface that is present in relation to the gas stream is important but also for example, because of the storage capability for oxygen, nitrogen oxides and/or ammonia, the thickness of the coating.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A metallic honeycomb body, comprising:
   a plurality of channels through which a gas may flow;
   a plurality of layers of at least partially structured sheet metal, each of the plurality of channels being made from the plurality of layers of at least partially structured sheet metal;
   a plurality of subregions being part of the plurality of layers of at least partially structured sheet metal;
   a first plurality of structures, the first plurality of structures being of a first type and having a first height, the height of each of the first plurality of structures determining the size of each of the plurality of channels;
   a second plurality of structures, each of the second plurality of structures having a corresponding trough and a corresponding peak, the second plurality of structures being of a second type and having a second height (h) which is less than the first height, the second height (h) of each of the second plurality of structures extending between each corresponding trough and each corresponding peak; and
   a ceramic coating applied to each of the plurality of second structures such that the ceramic coating fills the troughs;
   wherein the ceramic coating on average fills the troughs of each of the plurality of second structures to at least 10%, preferably at least 20%, particularly preferably at least 30%, in particular at least 50%, of the second height (h) of each of the plurality of second structures.

2. The metallic honeycomb body of claim 1, wherein each of the second plurality of structures further comprising:
   a plurality of flanks, each of the flanks extending between one of the corresponding troughs and one of the corresponding peaks; and
   a zigzag corrugation with at least one trough and at least one peak which, considered on average, form an acute angle (α) between flanks forming at least one of the corresponding troughs and one of the corresponding peaks, preferably an angle (α) of less than 75°, in particular less than 50°.

3. The metallic honeycomb body of claim 1, wherein the ceramic coating fills the troughs of the second structure to at least 20% of the second height (h), preferably to at least 30%, in particular at least 50%.

4. The metallic honeycomb body of claim 1, further comprising a coating applied to the honeycomb body for the removal of NOx from a gas stream.

5. The metallic honeycomb body of claim 1, wherein the second height (h) being of such a size that each of the second plurality of structures is partially covered by a coating, in particular at least 10%, preferably at least 30%, of the second height (h) remains after the coating is applied.

6. The metallic honeycomb body of claim 1, wherein the honeycomb body is wound from the plurality of layers of at least partially structured sheet metal, the plurality of layers of at least partially structured sheet metal being soldered to one another at a multiplicity of points of contact.

7. The metallic honeycomb body of claim 6, wherein at least one of the plurality of layers of at least partially structured sheet metal is smooth in the region of each of the points of contact.

8. The metallic honeycomb body of claim 1, wherein the first height of each of the first plurality of structures is between 1 mm and 4 mm.

9. The metallic honeycomb body of claim 1, wherein the second height (h) of each of the second plurality of structures is between 0.1 mm and 0.8 mm.

10. The metallic honeycomb body of claim 1, wherein the ratio of the first height of each of the first plurality of structures to the second height (h) of each of the second plurality of structures is generally greater than 1.3.

11. The metallic honeycomb body of claim 1, wherein the ratio of the first height of each of the first plurality of structures to the second height of each of the second plurality of structures is generally greater than 1.5.

12. The metallic honeycomb body of claim 1, further comprising a periodicity of the second plurality of structures, wherein the periodicity is between 0.05 and 0.2 mm.

13. The metallic honeycomb body of claim 1, wherein the ceramic coating converts nitrogen oxides (NOx) and/or hydrocarbons (CHx), of at least 200 g/l (grams per liter of volume of the honeycomb body), preferably at least 250 g/l, in particular approximately 300 g/l.

14. The metallic honeycomb body of claim 1, wherein the ceramic coating is applied to each of the plurality of second structures such that the ceramic coating fills the troughs on average to at least 10% of the second height (h).

* * * * *